US010554511B2

(12) United States Patent
Yamashita

(10) Patent No.: US 10,554,511 B2
(45) Date of Patent: Feb. 4, 2020

(54) INFORMATION PROCESSING APPARATUS, METHOD AND NON-TRANSITORY COMPUTER-READABLE STORAGE MEDIUM

(71) Applicant: FUJITSU LIMITED, Kawasaki-shi, Kanagawa (JP)

(72) Inventor: Shinji Yamashita, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 11 days.

(21) Appl. No.: 16/051,163

(22) Filed: Jul. 31, 2018

(65) Prior Publication Data

US 2019/0044834 A1 Feb. 7, 2019

(30) Foreign Application Priority Data

Aug. 4, 2017 (JP) .................................. 2017-151297

(51) Int. Cl.
| | | |
|---|---|---|
| *G06F 15/16* | (2006.01) | |
| *H04L 12/26* | (2006.01) | |
| *H04L 12/851* | (2013.01) | |
| *H04L 12/841* | (2013.01) | |

(Continued)

(52) U.S. Cl.
CPC ............ *H04L 43/026* (2013.01); *H04L 41/12* (2013.01); *H04L 43/04* (2013.01); *H04L 47/127* (2013.01); *H04L 47/2483* (2013.01); *H04L 47/28* (2013.01); *H04L 43/16* (2013.01)

(58) Field of Classification Search
CPC ....... H04L 43/026; H04L 41/12; H04L 43/04; H04L 47/127; H04L 47/2483; H04L 47/28; H04L 43/16
See application file for complete search history.

(56) References Cited

U.S. PATENT DOCUMENTS

| | | | | |
|---|---|---|---|---|
| 6,798,993 B1 * | 9/2004 | Adams | ................... | H04J 14/021 398/115 |
| 8,050,671 B2 * | 11/2011 | Calin | ..................... | H04W 16/00 370/341 |
| 9,219,562 B2 * | 12/2015 | Chen | ...................... | H04J 3/0644 |

(Continued)

FOREIGN PATENT DOCUMENTS

| | | |
|---|---|---|
| JP | 2002-16599 A | 1/2002 |
| JP | 2004-343203 A | 12/2004 |

(Continued)

*Primary Examiner* — Moustafa M Meky
(74) *Attorney, Agent, or Firm* — Fujitsu Patent Center

(57) ABSTRACT

An information processing apparatus is configured to acquire first communication amount information indicating a first communication amount per unit period of time of each of a plurality of flows at a first timing, specify a predictive communication amount per the unit period of time of each of the plurality of flows at a second timing later than the first timing, acquire second communication amount information indicating a second communication amount per the unit period of time of each of the plurality of flows at the second timing, specify a difference between the predictive communication amount and the second communication amount, specify a priority degree of each of the plurality of flows based on the difference and a topology value determined for each of the plurality of flows, and analyze the data traffic of a specific flow selected from the plurality of flows based on the priority degree.

20 Claims, 18 Drawing Sheets

(51) Int. Cl.
*H04L 12/24* (2006.01)
*H04L 12/801* (2013.01)

(56) References Cited

U.S. PATENT DOCUMENTS

| | | | |
|---|---|---|---|
| 9,706,431 B1* | 7/2017 | Tammisetti | H04W 28/0273 |
| 9,807,643 B1* | 10/2017 | Tammisetti | H04W 28/0273 |
| 2004/0042398 A1* | 3/2004 | Peleg | H04L 47/11 |
| | | | 370/230 |
| 2008/0108345 A1* | 5/2008 | Calin | H04W 16/00 |
| | | | 455/424 |
| 2014/0010235 A1 | 1/2014 | Ueno | |
| 2015/0016259 A1* | 1/2015 | Toillon | H04L 12/437 |
| | | | 370/235 |

FOREIGN PATENT DOCUMENTS

| | | |
|---|---|---|
| JP | 2013-69038 A | 4/2013 |
| WO | 2012/127894 A1 | 9/2012 |

\* cited by examiner

FIG. 8

| FLOW | SW | MATCH CONDITION (TRANSMISSION DESTINATION ADDRESS) | ACTION (TRANSMISSION DESTINATION PORT) | TRAFFIC (Byte) | ABNORMALITY DEGREE (PRECEDING CYCLE) | ABNORMALITY DEGREE (CURRENT CYCLE) | TOPOLOGY IMPORTANCE DEGREE | ABNORMALITY DEGREE DIFFERENCE | PRIORITY DEGREE |
|---|---|---|---|---|---|---|---|---|---|
| 1 | 1 | 10.1.1.1 | P12 | 100 | 10 | 50 | 100 | 40 | 190 |
| 2 | 1 | 10.2.2.2 | P13 | 50 | 15 | 30 | 100 | 15 | 145 |
| 3 | 2 | 10.1.1.1 | P21 | 100 | 10 | 50 | 10 | 40 | 100 |
| 4 | 2 | 10.2.2.2 | P21 | 50 | 15 | 30 | 10 | 15 | 55 |
| 5 | 3 | 10.1.1.1 | P31 | 100 | 10 | 50 | 10 | 40 | 100 |
| 6 | 4 | 10.2.2.2 | P43 | 50 | 15 | 30 | 10 | 15 | 55 |
| 7 | 4 | 10.3.3.3 | P41 | 300 | 20 | 70 | 100 | 50 | 220 |
| 8 | 5 | 10.1.1.1 | P51 | 100 | 10 | 50 | 10 | 40 | 100 |
| 9 | 5 | 10.2.2.2 | P52 | 50 | 15 | 30 | 10 | 15 | 55 |
| 10 | 5 | 10.3.3.3 | P52 | 300 | 20 | 70 | 10 | 50 | 130 |

FIG. 12

| FLOW | SW | MATCH CONDITION (TRANSMISSION DESTINATION ADDRESS) | ACTION (TRANSMISSION DESTINATION PORT) | TRAFFIC (Byte) | ABNORMALITY DEGREE (PRECEDING CYCLE) | ABNORMALITY DEGREE (CURRENT CYCLE) | TOPOLOGY IMPORTANCE DEGREE | ABNORMALITY DEGREE DEFERENCE | PRIORITY DEGREE |
|---|---|---|---|---|---|---|---|---|---|
| 1 | 1 | 10.1.1.1 | P12 | 100 | 10 | 50 | 100 | 40 | 190 |
| 2 | 1 | 10.2.2.2 | P13 | 50 | 15 | 30 | 100 | 15 | 145 |
| 3 | 2 | 10.1.1.1 | P21 | 100 | 10 | 50 | 10 | 40 | 100 |
| 4 | 2 | 10.2.2.2 | P21 | 50 | 15 | 30 | 10 | 15 | 55 |
| 5 | 3 | 10.1.1.1 | P31 | 100 | 10 | 50 | 10 | 40 | 100 |
| 6 | 4 | 10.2.2.2 | P43 | 50 | 15 | 30 | 10 | 15 | 55 |
| 7 | 4 | 10.3.3.3 | P41 | 300 | 20 | 70 | 100 | 50 | 220 |
| 8 | 5 | 10.1.1.1 | P51 | 100 | 10 | 50 | 10 | 40 | 100 |
| 9 | 5 | 10.2.2.2 | P52 | 50 | 15 | 30 | 10 | 15 | 55 |
| 10 | 5 | 10.3.3.3 | P52 | 300 | 20 | 70 | 10 | 50 | 130 |

FLOWS 7, 1, 2, AND 10 ARE SELECTED IN DESCENDING ORDER OF PRIORITY DEGREE AS ANALYSIS TARGET FLOW

FIG. 17A

BEFORE AGGREGATION

| FLOW | SW | MATCH CONDITION | ACTION (TRANSMISSION DESTINATION PORT) | TRAFFIC (Byte) | PRIORITY DEGREE |
|---|---|---|---|---|---|
| 1 | 1 | TRANSMISSION SOURCE 10.1.1.1 TRANSMISSION DESTINATION 10.4.4.4 | P11 | 200 | 10 |
| 2 | 1 | TRANSMISSION SOURCE 10.2.2.2 TRANSMISSION DESTINATION 10.4.4.4 | P11 | 500 | 15 |
| 3 | 4 | TRANSMISSION SOURCE 10.3.3.3 TRANSMISSION DESTINATION 10.5.5.5 | P41 | 1200 | 100 |

FIG. 17B

AFTER AGGREGATION

| FLOW | SW | MACH CONDITION | ACTION (TRANSMISSION DESTINATION PORT) | TRAFFIC (Byte) | PRIORITY DEGREE |
|---|---|---|---|---|---|
| 1 | 1 | TRANSMISSION DESTINATION 10.4.4.4 | P11 | 700 | 10 |
| 3 | 4 | TRANSMISSION SOURCE 10.3.3.3 TRANSMISSION DESTINATION 10.5.5.5 | P41 | 1200 | 100 |

FIG. 18A

BEFORE AGGREGATION

| FLOW | SW | MACH CONDITION | ACTION (TRANSMISSION DESTINATION PORT) | TRAFFIC (Byte) | PRIORITY DEGREE |
|---|---|---|---|---|---|
| 1 | 1 | TRANSMISSION DESTINATION 10.4.4.4 | P11 | 2000 | 2002 |
| 3 | 4 | TRANSMISSION SOURCE 10.3.3.3 TRANSMISSION DESTINATION 10.5.5.5 | P41 | 2002 | 303 |

FIG. 18B

AFTER AGGREGATION

| FLOW | SW | MACH CONDITION | ACTION (TRANSMISSION DESTINATION PORT) | TRAFFIC (Byte) | PRIORITY DEGREE |
|---|---|---|---|---|---|
| 1 | 1 | TRANSMISSION SOURCE 10.1.1.1 TRANSMISSION DESTINATION 10.4.4.4 | P11 | 19001 | 1801 |
| 2 | 1 | TRANSMISSION SOURCE 10.222 TRANSMISSION DESTINATION 10.4.4.4 | P11 | 1001 | 101 |
| 3 | 4 | TRANSMISSION SOURCE 10.3.3.3 TRANSMISSION DESTINATION 10.5.5.5 | P41 | 2002 | 303 |

INFORMATION PROCESSING APPARATUS, METHOD AND NON-TRANSITORY COMPUTER-READABLE STORAGE MEDIUM

CROSS-REFERENCE TO RELATED APPLICATION

This application is based upon and claims the benefit of priority of the prior Japanese Patent Application No. 2017-151297, filed on Aug. 4, 2017, the entire contents of which are incorporated herein by reference.

FIELD

The embodiments discussed herein relate to an information processing apparatus, a method and a non-transitory computer-readable storage medium.

BACKGROUND

A network manager collects and analyzes traffic of a network, for example, periodically in order to detect an abnormal state of the network. The network manager detects, for example, a sudden increase of the traffic as an abnormal state of the network. In order to suppress congestion of communication or failure of a specific apparatus by a sudden increase of the traffic, the network manager performs installation of a new switch or control of a communication path for distributing the traffic. As related documents, there are International Publication Pamphlet No. WO 2012/127894, Japanese Laid-open Patent Publication No. 2002-16599, and Japanese Laid-open Patent Publication No. 2004-343203.

SUMMARY

According to an aspect of the embodiments, an information processing apparatus configured to analyze data traffic of a plurality of flows transmitted through a plurality of switches, the information processing apparatus includes a memory, and a processor coupled to the memory and configured to acquire, from the plurality of switches, first communication amount information indicating a first communication amount per unit period of time of each of the plurality of flows at a first timing, specify, based on the first communication amount information, a predictive communication amount per the unit period of time of each of the plurality of flows at a second timing later than the first timing, acquire, from the plurality of switches, second communication amount information indicating a second communication amount per the unit period of time of each of the plurality of flows at the second timing, specify a difference between the predictive communication amount and the second communication amount for each of the plurality of flows, specify a priority degree of each of the plurality of flows based on the difference and a topology value determined for each of the plurality of flows in response to topology of the plurality of switches, and analyze the data traffic of a specific flow selected from the plurality of flows based on the priority degree.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 8 depicts an example of a flow related information table 324;
FIG. 12 depicts an example of a flow selected as an analysis target flow;
FIGS. 17A and 17B depict an example of aggregation of flows;
and
FIGS. 18A and 18B depict an example of distribution of a flow.

DESCRIPTION OF EMBODIMENTS

Along with popularization, for example, of a virtual network or internet of things (IoT), traffic to be analyzed is increasing. Therefore, analysis of traffic is performed, for example, using an application program for traffic analysis to make it possible to analyze lots of traffic within a short period of time.

However, any of a network manager and an application program for analysis sometimes fails to analyze all traffic in a network, which involves much traffic that becomes an analysis target, in a short period of time.

If it takes a long period of time to analyze all traffic, a delay occurs with network compliance, resulting in increase of time for improving the network against the abnormal state and degradation of the network quality to be provided to network users.

First Embodiment

A first embodiment is described.
<Example of Configuration of Communication System>

Figure 1:
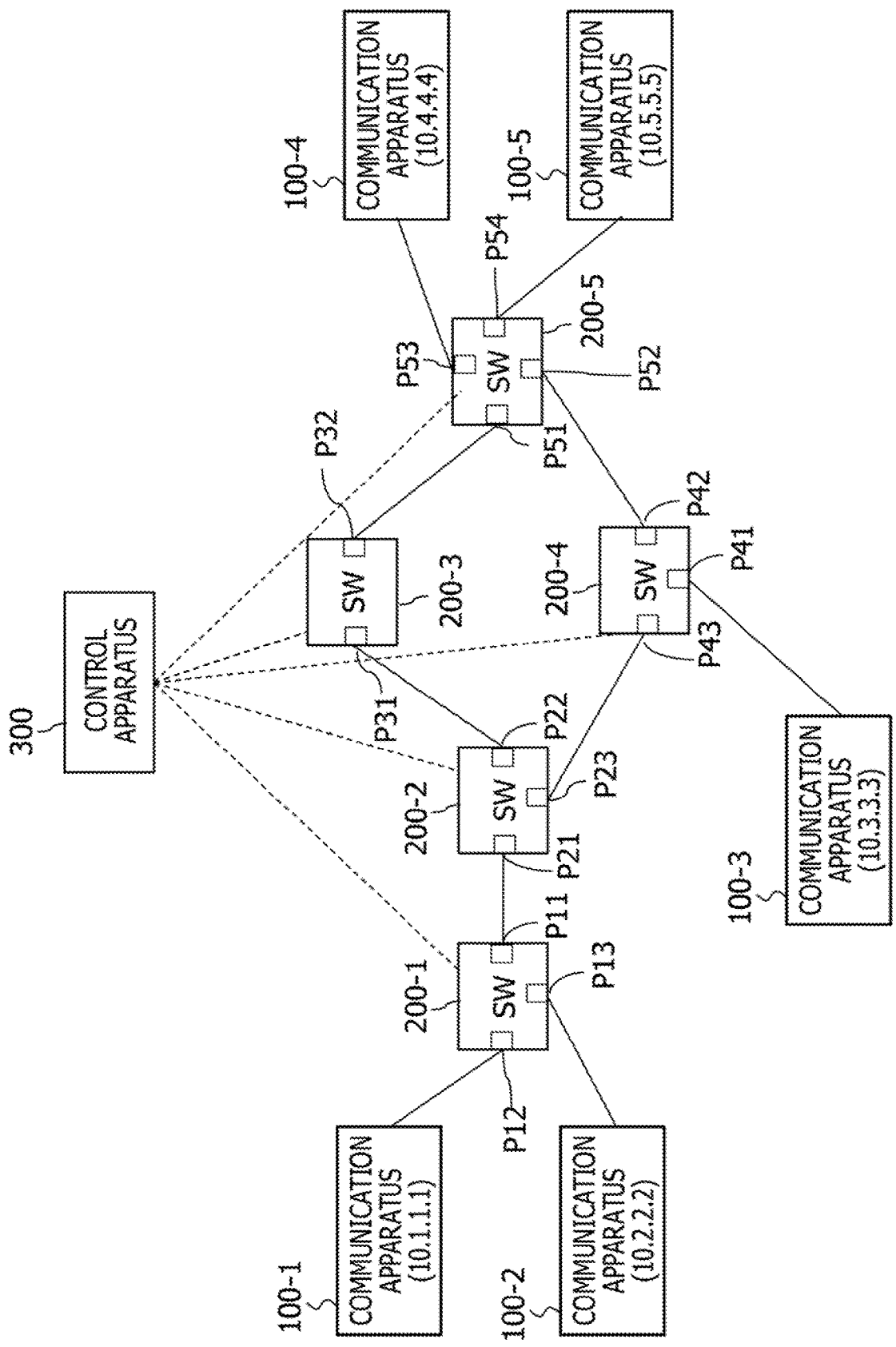
FIG. 1 depicts an example of a configuration of a communication system 10.

FIG. 1 is a view depicting an example of a configuration of a communication system 10. The communication system 10 includes communication apparatus 100-1 to 100-5, switches 200-1 to 200-5, and a control apparatus 300 (traffic analysis apparatus). The communication apparatus 100-1 to 100-5 (each hereinafter referred to sometimes as communication apparatus 100) implement communication by transmitting a data packet to a communication apparatus 100 of a communication partner through the switches 200-1 to 200-5 (each hereinafter referred to sometimes as switch 200). Each switch 200 transmits a received packet to an adjacent switch 200 or communication apparatus 100, for example, based on the address of a transmission source or a transmission destination of the received packet.

Each communication apparatus 100 has, for example, an internet protocol (IP) address and implements communication by placing the IP address as a transmission destination or a transmission source into a packet. Each numerical value in parentheses in FIG. 1 indicates an example of an IP address of a communication apparatus 100.

Each of the switches 200 includes a plurality of ports through which it is coupled to a different switch 200 or communication apparatus 100. The switch 200 is a device that switches a communication path and is, for example, a layer 3 switch, a layer 2 switch, or a local area network (LAN) switch.

For example, the switch 200-1 includes ports P11 to P13. The port P11 is coupled to a port P21 of the switch 200-2. The port P12 is coupled to the communication apparatus 100-1, and the port P13 is coupled to the communication apparatus 100-2. It is to be noted that the switch 200-2 includes ports P21 to P24; the switch 200-3 includes ports P31 to P32; the switch 200-4 includes ports P41 to P43; and the switch 200-5 includes ports P51 to P54.

The switch 200 manages to which apparatus the ports of the own apparatus are coupled and determines a port from which a packet is to be transmitted in response to a transmission destination of a received packet. For example, if the switch 200-2 receives a packet destined for the communication apparatus 100-1 at the port P22 or P23 thereof, it transmits the received packet from the port P21 that is coupled to the switch 200-1 that is to relay the packet to the communication apparatus 100-1.

Then, the switch 200 collects traffic in a unit of a flow and transmits the collected traffic to the control apparatus 300. A flow is, for example, a unit of communication and is classified depending upon a port number at which the packet is received or from which the packet is transmitted. Further, the flow may otherwise be classified depending upon the transmission source or the transmission destination of a packet relayed by the switch 200. For example, a flow is a unit of communication that is determined from at least one or some combination of a port number from which the packet is transmitted, a port number by which the packet is received, a transmission source of the packet, and a transmission destination of the packet.

The switch 200 transmits traffic to the control apparatus 300, for example, periodically or in response to a request from the control apparatus 300. The traffic is information collected by the switch 200 and is a data amount (communication amount) that passes a flow, for example, per unit time period. The switch 200 collects, for example, a data amount that passes a flow per unit time period and stores the collected data mount into an internal memory.

The control apparatus 300 acquires (receives) traffic for each flow from the switch 200 and performs analysis of the traffic. For example, in the case where the control apparatus 300 performs traffic analysis periodically, since the traffic analysis is completed at latest before a timing at which traffic analysis in the succeeding cycle is to be performed, the control apparatus 300 sometimes fails to perform the traffic analysis for all flows. Therefore, the control apparatus 300 calculates a priority degree for each flow and preferentially analyzes a flow having a high priority degree. The control apparatus 300 calculates the priority degree for each flow based on an abnormality degree (abnormality value), an abnormality degree difference (abnormality value difference), and a topology importance degree (topology value) for each flow.

The control apparatus 300 calculates an abnormality degree for each flow based on the received traffic (communication amounts). The abnormality degree is, for example, a degree of difference between actually acquired traffic (hereinafter referred to sometimes as real traffic) and traffic predicted by the manager of the control apparatus 300 or the communication system 10 (hereinafter referred to sometimes as predictive traffic). The abnormality degree indicates, for example, a value that increases as the difference between the real traffic and the predictive traffic increases. A flow that indicates a high abnormality degree occurs some abnormality with high possibility. It is to be noted that a calculation method of the abnormality degree is hereinafter described.

Further, the control apparatus 300 calculates an importance degree for each flow based on the topology (hereinafter referred to sometimes as topology importance degree). The topology importance degree is an importance degree calculated, for example, based on an installation location the switch 200 to which the flow belongs in the communication system 100 and an apparatus or apparatus adjacent the switch 200 to which the flow belongs. The topology importance degree, for example, of a flow belonging to a switch 200 that is not positioned adjacent the communication apparatus 100 is lower than that of a flow of another switch 200 that is positioned adjacent the communication system 100. Further, the topology Importance degree is high in the case where it is difficult, for example, to use a different switch 200 for the communication path.

The control apparatus 300 calculates a priority degree for each flow based on the calculated abnormality degrees and topology importance degrees and preferentially analyzes a flow having a high calculated priority degree. Consequently, for example, even in the case where it is difficult for the control apparatus 300 to analyze all flows of traffic in a certain collection cycle, the control apparatus 300 may select a flow or flows to be analyzed in accordance with the priority degrees. In comparison with an alternative case in which the control apparatus 300 selects a flow to be analyzed, for example, at random, the control apparatus 300 may preferentially analyze a flow that occurs some abnormality with a high degree of possibility, and the possibility that an abnormal state in the network may be detected at an early stage increases.

<Example of Configuration of Control Apparatus>

Figure 2:
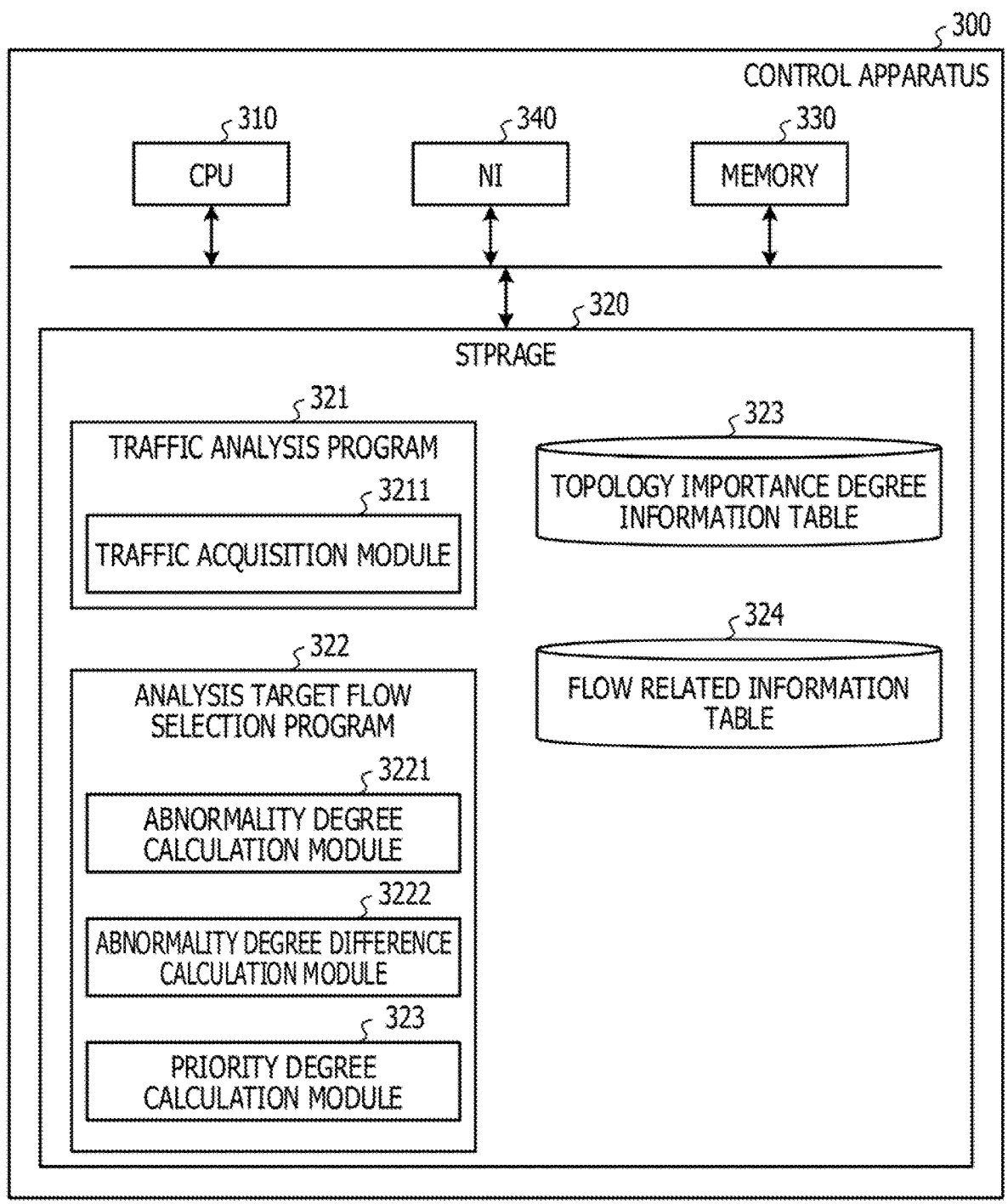
FIG. 2 depicts an example of a configuration of a control apparatus 300.

FIG. 2 is a view depicting an example of a configuration of the control apparatus 300. The control apparatus 300 is, for example, a computer and includes a central processing unit (CPU) 310, a storage 320, a memory 330, and a network interface (NI) 340. The control apparatus 300 acquires traffic from the switches 200 in the communication system 10 and analyzes the traffic for each flow.

The storage 320 is an auxiliary storage apparatus that stores programs and data such as a flash memory, a hard disk drive (HDD), a solid state drive (SSD) or the like. The storage 320 includes a traffic analysis program 321, an analysis target flow selection program 322, a topology importance degree information table 323, and a flow related information table 324.

The topology importance degree information table 323 is a table that stores, for example, a topology importance degree for each flow. The topology importance degree information table 323 is registered in advance, for example, by the manager of the control apparatus 300 (or by the manager of the communication system 10). Further, in the topology importance degree information table 323, a topology importance degree for each flow determined by a topology importance degree determination process hereinafter described may be stored by the control apparatus 300.

The flow related information table 324 is a table that stores, for example, traffic or a priority degree for each flow. It is to be noted that details of the flow related information table 324 are hereinafter described.

The memory 330 is a region into which a program stored in the storage 320 is to be loaded. The memory 330 is used also as a region into which a program or data is to be stored.

The NI 340 is an apparatus that is coupled for communication to the switch 200. The NI 340 is a network interface card that is coupled to a switch 200, for example, through a network cable. The NI 340 may otherwise be coupled to a switch 200, for example, through a hub.

The CPU 310 is a processor that loads a program stored in the storage 320 into the memory 330 and executes the loaded program to implement various processes.

The CPU 310 executes the traffic analysis program 321 to construct an analysis unit and performs a track analysis process. The traffic analysis process is a process for acquiring traffic for each flow from the switch 200 and analyzing the acquired traffic. The control apparatus 300 selects, in the traffic analysis process, a given number of flows and analyzes the traffic of the selected flows.

Further, the CPU 310 executes a traffic acquisition module 3211 the traffic analysis program 321 includes to construct an acquisition unit and performs a traffic acquisition process. The traffic acquisition process is a process for receiving the traffic for each flow from the switch 200. The control apparatus 300 transmits, for example, a traffic request message for requesting transmission of traffic to the switch 200 periodically in the traffic acquisition process and receives a traffic response message including traffic transmitted from a switch that responds to the traffic request message. Further, the control apparatus 300 receives, in the traffic acquisition process, a traffic notification message including traffic transmitted periodically from the switch 200.

The CPU 310 executes the analysis target flow selection program 322 to construct a calculation unit and an analysis unit and performs an analysis target flow selection process. The analysis target flow selection process is a process for selecting a flow to be made an analysis target of the traffic. The control apparatus 300 selects the number of flows that may be analyzed within a cycle within which traffic is acquired in the analysis target flow selection process.

Further, the CPU 310 executes an abnormality degree calculation module 3221 the analysis target flow selection program 322 includes to construct a calculation unit and performs an abnormality degree calculation process. The abnormality degree calculation process is a process for calculating an abnormality degree for each flow based on the received traffic.

Furthermore, the CPU 310 executes an abnormality degree difference calculation module 3222 the analysis target flow selection program 322 includes to construct an analysis unit and a calculation unit and performs an abnormality degree difference calculation process. The abnormality degree difference calculation process is a process for calculating, for each flow, a difference between the calculated abnormality degree and an abnormality degree calculated when traffic is acquired in the preceding cycle.

Further, the CPU 310 executes a priority degree calculation module 3223 the analysis target flow selection program 322 includes to construct an analysis unit and performs a priority degree calculation process. The priority degree calculation process is a process for calculating, for each flow, a priority degree with which traffic analysis is to be performed based on the abnormality degrees, abnormality degree differences, and topology importance degrees.

<Example of Configuration of Switch>

Figure 3:
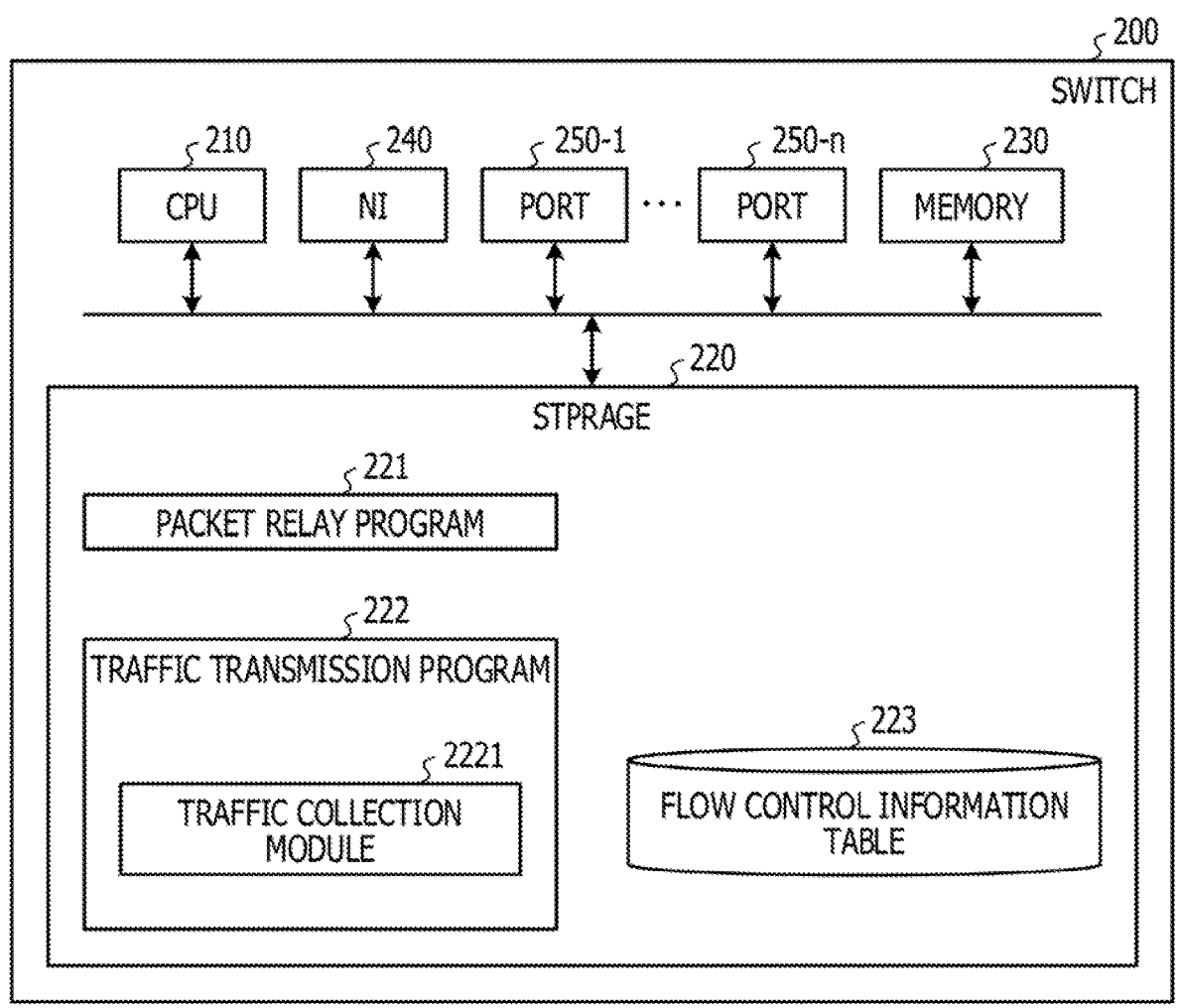
FIG. 3 depicts an example of a configuration of a switch 200.

FIG. 3 is a view depicting an example of a configuration of the switch 200. The switch 200 includes a CPU 210, a storage 220, a memory 230, an NI 240, and ports 250-1 to 250-n. The switch 200 is a relay apparatus that relays a packet to be exchanged between the communication apparatus 100.

The storage 220 is an auxiliary storage apparatus that stores programs or data such as a flash memory, an HDD, an SSD or the like. The storage 220 includes a packet relay program 221, a traffic transmission program 222, and a flow control information table 223.

The flow control information table 223 is a table in which, for example, a relationship of a transmission source, a transmission destination, and a transmission destination port number of a received packet is stored. If the switch 200 receives a packet, it refers to the flow control information table 223 to determine a transmission destination of the received packet.

The memory 230 is a region into which a program stored in the storage 220 is to be loaded. The memory 230 is used also as a region into which a program or data is to be stored.

The NI 240 is an apparatus that couples for communication to the control apparatus 300. The NI 240 is a network interface card that couples to the control apparatus 300, for example, through a network cable. Further, the NI 240 may be coupled to the control apparatus 300, for example, through a hub or the like.

The ports 250-1 to 250-n are coupling interfaces for coupling to another switch 200 or communication apparatus 100. The ports 250-1 to 250-n correspond, for example, to the ports P11 to P13 of the switch 2001.

The CPU 210 is a processor that loads a program stored in the storage 220 into the memory 230 and executes the loaded program to implement various processes.

The CPU 210 executes the packet relay program 221 to construct a relay unit and performs a packet relay process. The packet relay process is a process for relaying a packet to be exchanged between the communication apparatus 100. The switch 200 receives, in the packet relaying process, a packet from an adjacent (coupled) switch 200 or communication apparatus 100 and transmits the received packet based on a transmission destination of the packet. It is to be noted that the switch 200 refers to the flow control information table 223 to determine a port from which the packet is to be transmitted.

The CPU 210 executes the traffic transmission program 222 to construct a transmission unit and performs a traffic transmission process. The traffic transmission process is a process for collecting traffic and transmitting the collected traffic to the control apparatus 300. The switch 200 transmits, in the traffic transmission process, traffic when the control apparatus 300 requests for transmission of traffic or when a timer that triggers transmission of traffic counts out. The switch 200 collects traffic for each flow and transmits the traffic to the control apparatus 300. The traffic is, for example, a communication amount per unit time period. The traffic may otherwise be an average value of the transmission rate within a given period of time. Further, the traffic is information indicative of a good degree of communication and may include, for example, a reception number or ratio of error packets, a no-communication time period or the like.

Further, the CPU 210 executes a traffic collection module 2221 the traffic transmission program 222 includes to construct a collection unit and performs a traffic collection process. The traffic collection process is a process for collecting traffic for each flow. The switch 200 monitors, in the traffic collection process, for example, a packet to be exchanged and stores a data amount to be exchanged into the internal memory.

<Traffic Analysis Process>

Figure 4:
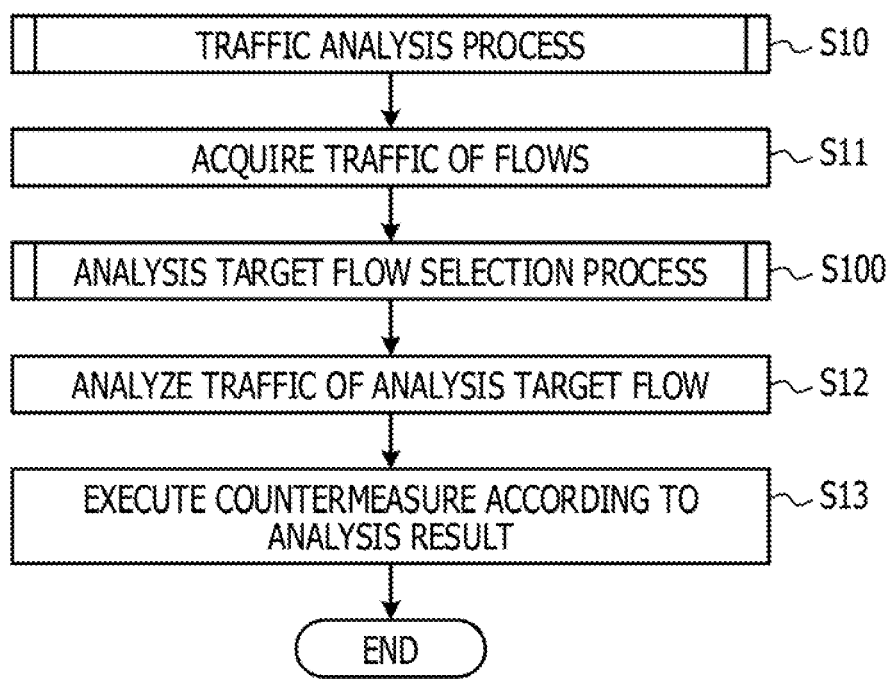
FIG. 4 depicts an example of a processing flow chart of a traffic analysis process.

FIG. 4 is a view depicting an example of a processing flow chart of the traffic analysis process. The control apparatus 300 executes a traffic analysis process S10, for example, periodically. The control apparatus 300 acquires traffic of each flow in the traffic analysis process S10 (S11). The acquisition of traffic is performed, for example, by receiving a message including traffic from a switch 200. Alternatively, for the acquisition of traffic, the control apparatus 300 may transmit a message requesting to transmit a message including traffic to the switch 200.

Then, the control apparatus 300 performs an analysis target flow selection process (S100). In the analysis target flow selection process S100, the control apparatus 300 selects a flow that is to be made a target whose traffic analysis is to be performed. It is to be noted that, in the case where the control apparatus 300 may perform analysis of traffic of all flows within a traffic measurement cycle, the control apparatus 300 may select all flows as an analysis target flow. The analysis target flow selection process S100 is hereinafter described.

Then, the control apparatus 300 analyzes the traffic of the analysis target flow (S12). The traffic analysis is to detect a problem that may occur with the communication system 10 such as occurrence of a sudden increase or decrease of the communication amount, appearance of a significant difference from predictive traffic or the like.

Then, the control apparatus 300 executes a countermeasure suitable for a result of the analysis (S13). The countermeasure suitable for a result of the analysis is, for example, a countermeasure of additionally incorporating a new switch 200 into the communication system 10 or exchanging a switch 200 that generates the problem. Further, the control apparatus 300 may display the analysis result on a display unit of the control apparatus 300 or may file the analysis result as character data in order to notify the manager of the control apparatus 300 of the analysis result.

Figure 5:
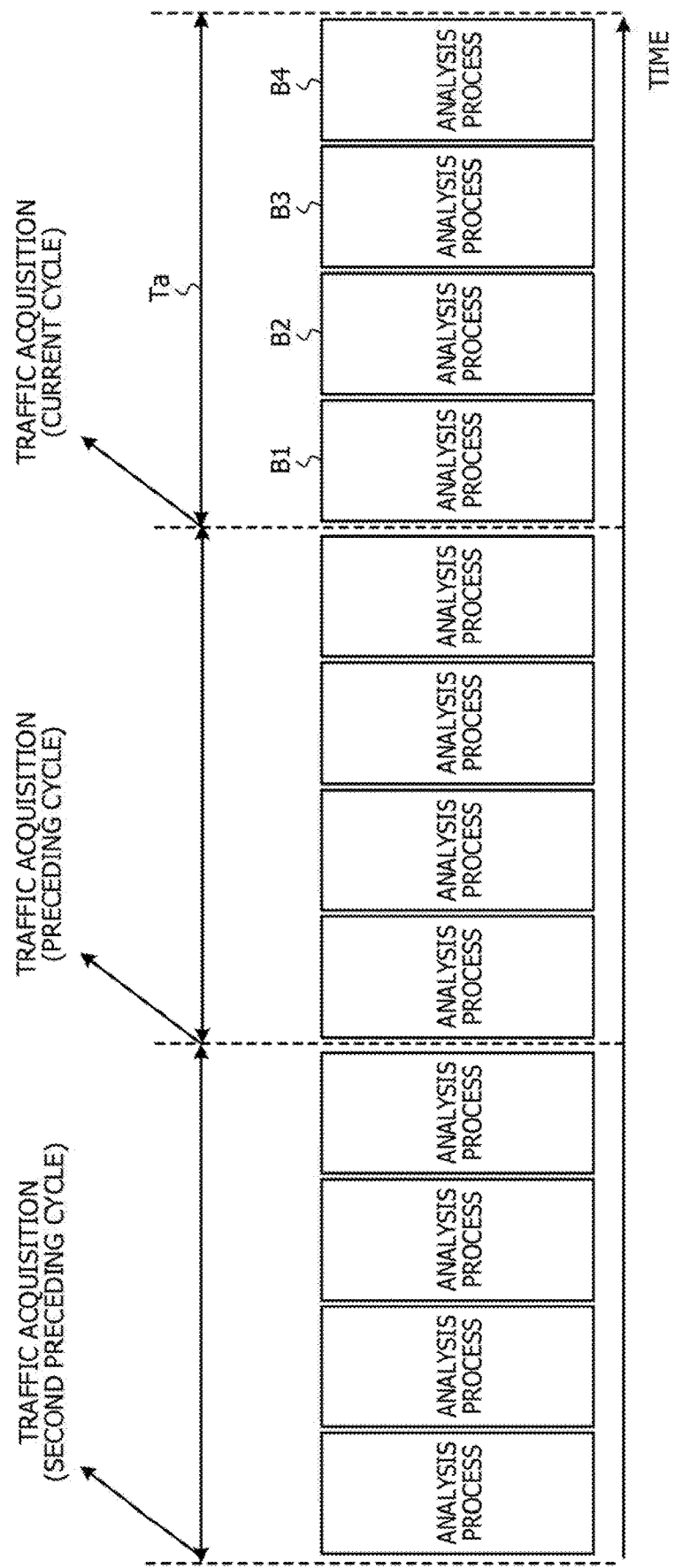
FIG. 5 depicts an example of a traffic analysis process.

FIG. 5 is a view depicting an example of the traffic analysis process. The control apparatus 300 acquires traffic for each flow after every traffic analysis cycle Ta. Then, the control apparatus 300 analyzes a given number of flows within a period of the traffic analysis cycle Ta. In FIG. 4, the control apparatus 300 analyzes, for example, four flows. For example, in the analysis target flow selection process S100 of FIG. 4, the control apparatus 300 selects four flows as an analysis target flow. Then, when the control apparatus 300 completes analysis processes B1 to B4 and the traffic analysis cycle Ta elapses, the control apparatus 300 acquires new traffic. The control apparatus 300 repetitively carries out the analysis process of the flows after every traffic analysis cycle Ta as depicted in FIG. 5.

<Analysis Target Flow Selection Process>

Figure 6:
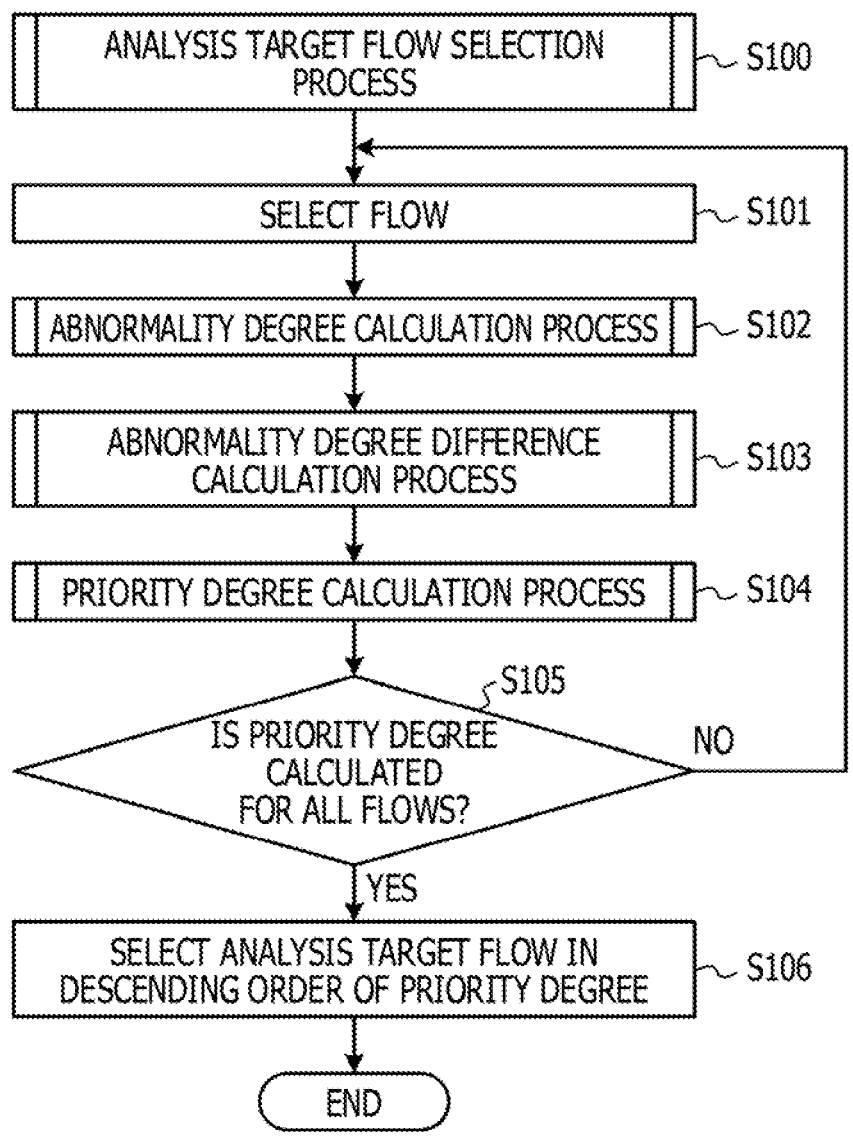
FIG. 6 depicts an example of a processing flow chart of an analysis target flow selection process S100.

FIG. 6 is a view depicting an example of a processing flow chart of the analysis target flow selection process S100. The control apparatus 300 selects a flow (S101). The selection process S101 is a process for selecting a flow that is made a target for calculating a priority degree hereinafter described. The control apparatus 300 performs the selection process S101 such that the priority degree is calculated for all flows until after the analysis target flow selection process S100 is completed. In the selection process S101, the control apparatus 300 selects a flow, for example, in the ascending order of the flow identifier (ID).

The control apparatus 300 performs an abnormality degree calculation process (S102). The abnormality degree calculation process S102 is a process for calculating an abnormality degree that is a numerical value based on the difference between the traffic acquired in the current cycle (sometimes referred to as real traffic) and predictive traffic. It is to be noted that the traffic used for the abnormality degree calculation is, for example, a communication amount per unit time period in the flow.

Figure 7:
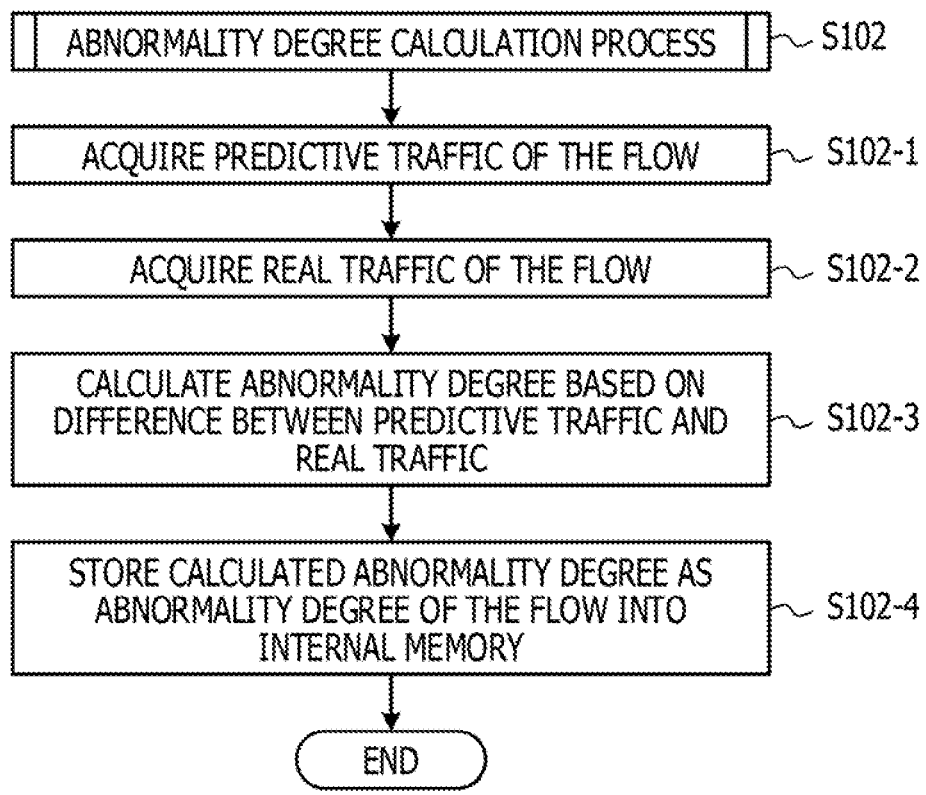
FIG. 7 depicts an example of a processing flow chart of an abnormality degree calculation process S102.

FIG. 7 is a view depicting an example of a processing flow chart of the abnormality degree calculation process S102. The control apparatus 300 acquires predictive traffic of the flow (S102-1). The flow here is a flow selected in the selection process S101 of the analysis target flow selection process S100.

The control apparatus 300 calculates predictive traffic in the process S102-1. The control apparatus 300 has traffic acquired in the past and stored in the internal memory thereof. Then, the control apparatus 300 selects an auto regressive (AR) model as a time series model of the stored traffic and creates a variation model based on the AR model. For example, the control apparatus 300 applies the stored traffic to the AR model to calculate a coefficient for the AR model and uses the calculated coefficient to calculate predictive traffic upon acquisition of traffic in the succeeding cycle.

It is to be noted that, for example, when the control apparatus 300 acquires traffic, it may calculate predictive traffic when traffic is acquired in the succeeding cycle and store the calculated predictive traffic into the internal memory. In this case, the control apparatus 300 takes out, in the process S102-1, the predictive track stored in the internal memory and calculated upon acquisition of traffic in the preceding cycle from the internal memory and acquires the predictive traffic.

Then, the control apparatus 300 acquires real traffic of the flow (S102-2). The control apparatus 300 calculates an, abnormality degree based on the difference between the predictive traffic and the real traffic (S102-3). The abnormality degree is given, for example, by the squared difference between the predictive traffic and the real traffic. Alternatively, the abnormality degree may be, for example, an absolute value of the difference between the predictive traffic and the real traffic.

The control apparatus 300 stores the calculated abnormality degree as the abnormality degree of the flow into the internal memory (S102-4). The control apparatus 300 stores the abnormality degree, for example, into the flow related information table 324.

FIG. 8 is a view depicting an example of the flow related information table 324. The flow related information table 324 includes information factors of "flow," "SW," "match condition," "action," "traffic (Byte)," "abnormality degree (preceding cycle)," "abnormality degree (current cycle)," "topology importance degree," "abnormality degree difference," and "priority degree."

"flow" indicates a flow ID. The flow ID is a number applied to each flow and is an identifier uniquely indicating the flow. The flow IDs may be random numbers or may be numbers applied in a generation order of the flows.

"SW" is an identifier of the switch 200. The number of "SW" in FIG. 6 indicates m in the switch 200-m. For example, in FIG. 6, "1" of "SW" indicates the switch 200-1.

"match condition" indicates a condition in which "action" is performed for a received packet. In FIG. 6, "match condition" indicates a transmission destination address. Meanwhile, "action" indicates, when a packet that satisfies "match condition" is received, a port number from which the received packet is to be transmitted.

Referring to FIG. 8, for example, the flow 1 indicates that, in the case where the transmission destination address of a packet received by the switch 200-1 is "10.1.1.1," this indicates that the received packet is to be transmitted to the port P12 of the switch 200-1.

It is to be noted that "flow," "match condition," and "action" may be information factors of the flow control information table 223 the switch 200 has. By storing "flow," "match condition," and "action" into the flow control information table 223, the switch 200 may refer to the flow control information table 223 to determine a transmission destination of the received packet.

"traffic (Byte)" indicates traffic that is a data amount per unit time period. Further, the unit of "traffic (Byte)" is Byte. It is to be noted that the traffic stored in "traffic (Byte)" is real traffic.

"abnormality degree (preceding cycle)" is an abnormality degree calculated upon reception of traffic in the preceding cycle (upon traffic analysis in the preceding cycle). Meanwhile, "abnormality degree (current cycle)" is an abnormality degree calculated upon reception of traffic in the current cycle. "abnormality degree (preceding cycle)" is updated simultaneously, for example, at an update timing of "abnormality degree (current cycle)."

"topology importance degree" indicates a topology importance degree. It is to be noted that the topology importance degree is a value determined by the configuration of the switch 200 or the communication apparatus 100 of the communication system 10 and is stored, for example, by the manager in advance. A determination method of the topology importance degree is hereinafter described.

"abnormality degree difference" indicates an abnormality degree difference that is a value obtained by subtracting "abnormality degree (preceding cycle)" from "abnormality degree (current cycle)." A calculation method for an abnormality degree difference is hereinafter described.

"priority degree" is a priority degree by which track analysis is to be performed. A calculation method of the priority degree is hereinafter described.

The control apparatus 300 calculates an abnormality degree by the abnormality degree calculation process S102 depicted in FIG. 7. For example, according to FIG. 8, the control apparatus 300 calculates an abnormality degree "10" based on the rear traffic "100" of the flow 1 and the predictive traffic and stores the abnormality degree "10" into the flow related information table 324. Similarly, the control apparatus 300 calculates and stored abnormality degrees of the flows 2 to 10 into the flow related information table 324.

Referring back to the processing flow chart of FIG. 6, the control apparatus 300 performs an abnormality degree difference calculation process (S103). The abnormality degree difference calculation process S103 is a process for calculating an abnormality degree difference.

Figure 9:
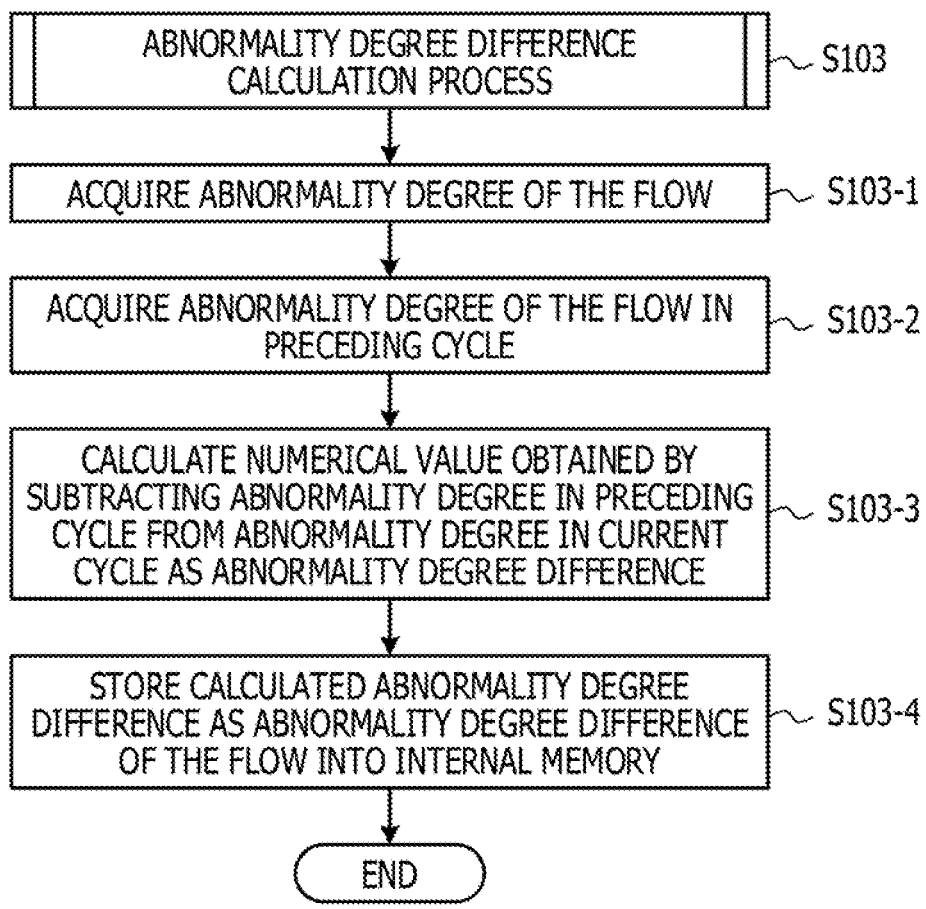
FIG. 9 depicts an example of a processing flow chart of an abnormality degree difference calculation process.

FIG. 9 is a view depicting an example of a processing flow chart of the abnormality degree difference calculation process. The control apparatus 300 acquires an abnormality degree of the flow (S103-1). In the process S103-1, the control apparatus 300 acquires the abnormality degree from "abnormality degree (current cycle)" of the flow related information table 324.

The control apparatus 300 acquires an abnormality degree of the flow in the preceding cycle (S103-2). In the process S103-2, the control apparatus 300 acquires an abnormality degree in the preceding cycle from "abnormality degree (preceding cycle)" of the flow related information table 324.

The control apparatus 300 calculates a numerical value obtained by subtracting the abnormality degree in the preceding cycle from the abnormality degree in the current cycle as abnormality degree difference (S103-3). It is to be noted that the abnormality degree difference may otherwise be an absolute value of the numerical value obtained by subtracting the abnormality degree in the preceding cycle from the abnormality degree in the current cycle.

The control apparatus 300 stores the calculated abnormality degree difference as an abnormality degree difference of the flow into the internal memory (S103-4). In the process S103-4, the control apparatus 300 stores the abnormality degree difference into the flow related information table 324.

The control apparatus 300 calculates, for example, the numerical value "40" as the abnormality degree difference of the flow 1 by subtracting the abnormality degree "10" in the preceding cycle from the abnormality degree "50" in the current cycle as depicted in FIG. 8 and stores the numerical value "40" into the flow related information table 324. The control apparatus 300 similarly calculates and stores the priority degree differences of the flows 2 to 10 into the flow related information table 324.

Referring back to the processing flow chart of FIG. 6, the control apparatus 300 performs a priority degree calculation process (S104). The priority degree calculation process S104 is a process for calculating a priority degree of traffic analysis.

Figure 10:
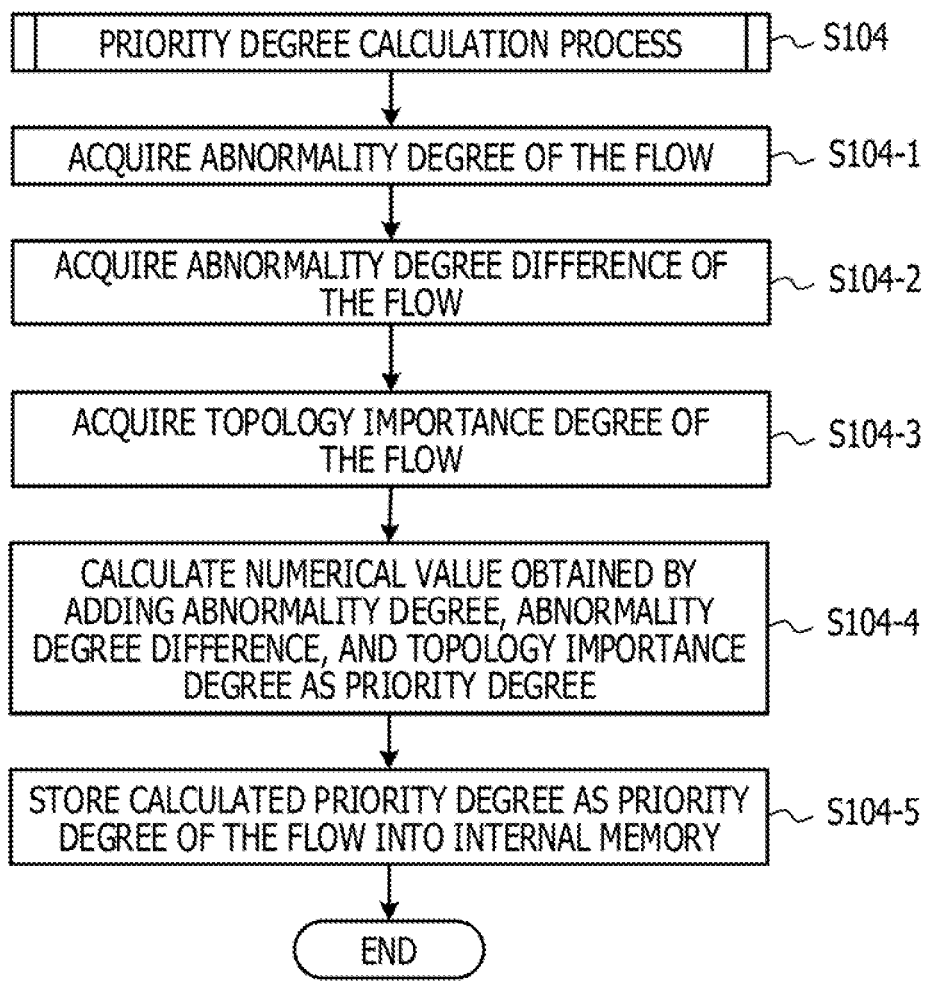
FIG. 10 depicts an example of a processing flow chart of a priority degree calculation process S104.

FIG. 10 is a view depicting an example of a processing flow chart of the priority degree calculation process S104. The control apparatus 300 acquires an abnormality degree of the flow (S104-1). Then, the control apparatus 300 acquires the abnormality degree difference of the flow (S104-2). The control apparatus 300 acquires the abnormality degree and the abnormality degree difference from the flow related information table 324 in the processes S104-1 and S104-2.

The control apparatus 300 acquires a topology importance degree of the flow (S104-3). In the process S104-3, the control apparatus 300 refers to the topology importance degree information table 323 to acquire a topology importance degree of the flow.

Figure 11:
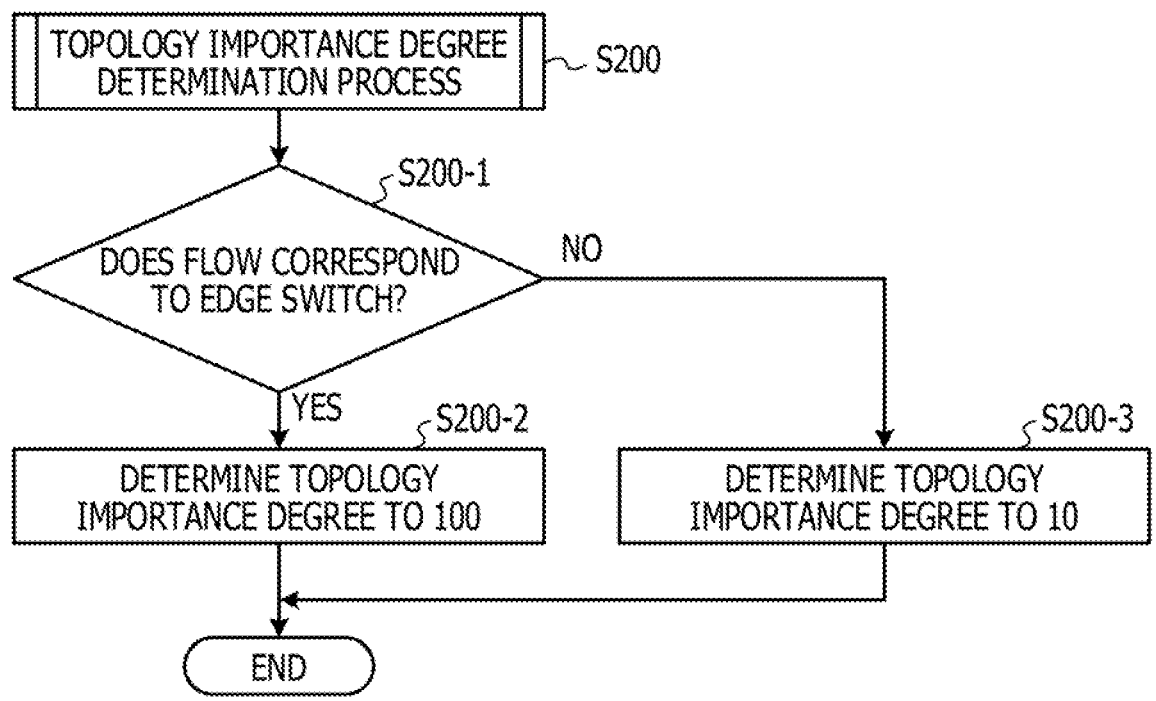
FIG. 11 depicts an example of a processing flow chart of a topology importance degree determination process S200.

FIG. 11 is a view depicting an example of a processing flow chart of the topology importance degree determination process S200. The control apparatus 300 (or the manager) decides whether or not the flow corresponds to an edge switch (S200-1). The edge switch is a switch 200 positioned at a termination of communication and is, for example, a switch 200 coupled directly without the intervention of any communication apparatus 100 and any other switch 200.

For example, in FIG. 8, the flow 6 is a flow of the switch 200-4 and the transmission destination is the communication apparatus 100-2 that has "10.2.2.2" as its IP address. According to FIG. 1, a packet transmitted from the switch 200-4 toward the communication apparatus 100-2 passes the switch 200-2 and the switch 200-1. For example, the switch 200-4 to which the flow 6 belongs is not an edge switch in the communication in which the transmission destination is the communication apparatus 100-2.

On the other hand, in FIG. 8, the flow 7 is a flow of the switch 200-4, and the transmission destination is the communication apparatus 100-3 that has "10.3.3.3" as its IP address. According to FIG. 1, a packet transmitted from the switch 200-4 toward the communication apparatus 100-3 does not pass any other switch. For example, the switch 200-4 to which the flow 7 belongs is an edge switch in the communication in which the transmission destination is the communication apparatus 100-3.

If the control apparatus 300 decides that the switch 200 to which the flow belongs is an edge switch (Yes in S200-1), it determines the topology importance degree as 100 (S200-2). On the other hand, if the control apparatus 300 decides that the switch 200 to which the flow belongs is not an edge switch (No in S200-1), it determines the topology importance degree as 10 (S200-3). For example, in the case where the switch 200 to which the flow belongs is not an edge switch, the control apparatus 300 sets the topology importance degree to a first value (10 in FIG. 11), but in the case where the switch 200 is an edge switch, the control apparatus 300 sets the topology importance degree to a second value (100 in FIG. 11) that is higher than the first value. Consequently, the topology importance degree of the flow belonging to the edge switch is high, and the priority degree of the flow belonging to the edge switch is low.

Referring back to the processing flow chart of FIG. 10, the control apparatus 300 calculates a numerical value obtained by adding the abnormality degree, abnormality degree difference, and topology importance degree as a priority degree (S104-4). Then, the control apparatus 300 stores the calculated priority degree as the priority degree of the flow into the internal memory (S104-5). The control apparatus 300 stores the priority degree into the flow related information table 324 in the process S104-5.

As depicted in FIG. 8, the control apparatus 300, for example, stores the numerical value "190" obtained by adding the abnormality degree "50," abnormality degree difference "40," and topology importance degree "100" in the current cycle as the priority degree of the flow 1 into the flow related information table 324. The control apparatus 300 similarly calculates and stores the priority degrees of the flows 2 to 10 into the flow related information table 324.

Referring back to the processing flow chart of FIG. 6, the control apparatus 300 confirms whether or not the priority degree is calculated for all flows (S105). In the case where the control apparatus 300 does not calculate the priority degree for all flows (No in S105), it selects a flow that has not been selected as yet (S101) and performs the processes S102 to S104 for the selected flow.

In the case where the priority degree is calculated already for all flows (Yes in S105), the control apparatus 300 selects an analysis target flow in the descending order of the priority degree (S106) and then ends the processing.

FIG. 12 is a view depicting an example of a flow selected as an analysis target flow. The control apparatus 300 selects, for example, four flows as an analysis target flow in the process S106 of FIG. 6. According to FIG. 12, the flow having the highest priority degree is the flow 7 of the priority degree "220." According to FIG. 12, the flow having the second highest priority degree is the flow 1 of the priority degree "190." According to FIG. 12, the flow having the third highest priority degree is the flow 2 of the priority degree "145." Further, according to FIG. 12, the flow having the fourth highest priority degree is the flow 10 of the priority degree "130." The control apparatus 300 selects the flows 1, 2, 7, and 10 indicated by shadows in FIG. 12 as analysis target flows of traffic.

In the first embodiment, the control apparatus 300 preferentially determines a flow having a high priority degree as an analysis target flow. The flow having a high priority degree is a flow whose traffic analysis is to be carried out preferentially because the flow is high in possibility that it may occur some abnormality or for which a countermeasure is to be taken quickly when some abnormality occurs with the flow. Consequently, the control apparatus 300 may preferentially analyze a flow having a high importance degree or a flow that occurs some abnormality with a high degree of possibility, and even in a case in which analysis of traffic of all flows is difficult, the possibility that serious abnormality may be detected increases.

Second Embodiment

Now, a second embodiment is described. In the second embodiment, the control apparatus 300 performs selection of an analysis target flow at two stages. The control apparatus 300 selects, in primary selection, a flow in a descending order of the priority degree. Then, in secondary selection (second selection), the control apparatus 300 selects a flow from among flows, which have not been selected by the primary selection, in accordance with a condition other than the priority degree.

<Analysis Target Flow Selection Process>

Figure 13:
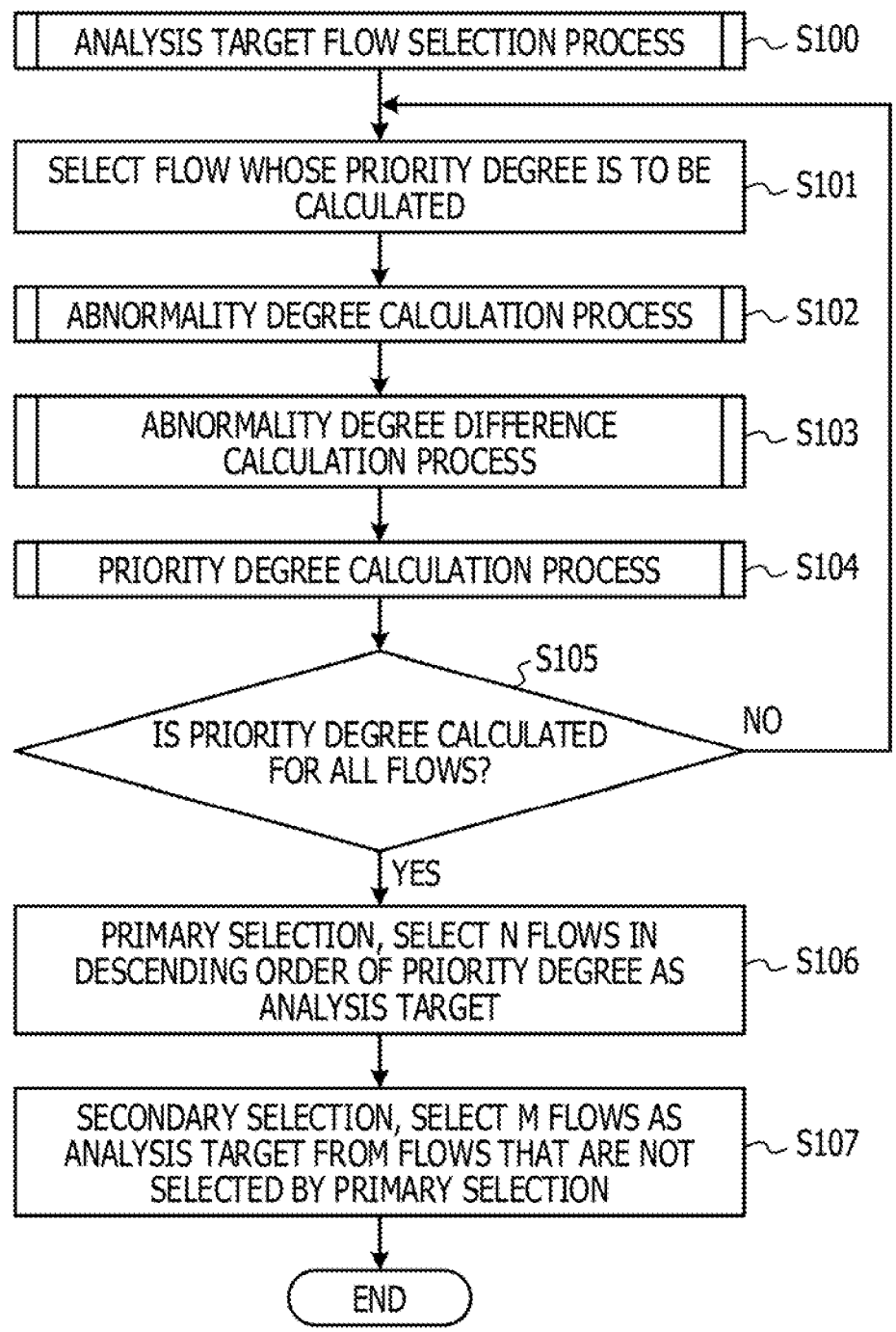
FIG. 13 depicts an example of a processing flow of an analysis target flow selection process S100 in a second embodiment.

FIG. 13 is a view depicting an example of a processing flow of the analysis target flow selection process S100 in the second embodiment. Processes S101 to S105 are similar to those of the analysis target flow selection process S100 depicted in FIG. 6.

If the control apparatus 300 detects priority degrees of all flows (Yes in S105), the control apparatus 300 performs primary selection (S107). The primary selection S107 is a process of selecting N flows in the descending order of the priority degree as an analysis target. N is, for example, a number smaller than the number of flows for which traffic analysis may be performed within a traffic collection cycle.

Then, the control apparatus 300 performs secondary selection (S108). The secondary selection S108 is a process of selecting M flows as an analysis target from the flows that have not been selected by the primary selection. In the secondary selection S108, the control apparatus 300 selects M flows irrespective of the priority degree. M is, for example, a number obtained by subtracting the selection number N by the primary selection S107 from the number of flows whose traffic analysis may be performed within a traffic collection cycle by the control apparatus 300. For example, the control apparatus 300 determines N+M flows as an analysis target.

In the secondary selection S108, the control apparatus 300 selects M analysis target flows, for example, at random (unintentionally).

Further, in the secondary selection S108, the control apparatus 300 may select M analysis target flows, for example, from flows that have not been analyzed for more than a given period of time.

Furthermore, in the secondary selection S108, the control apparatus 300 may select M analysis target flows, for example, in the descending order of the period of time within which analysis has not been performed.

Figure 14:
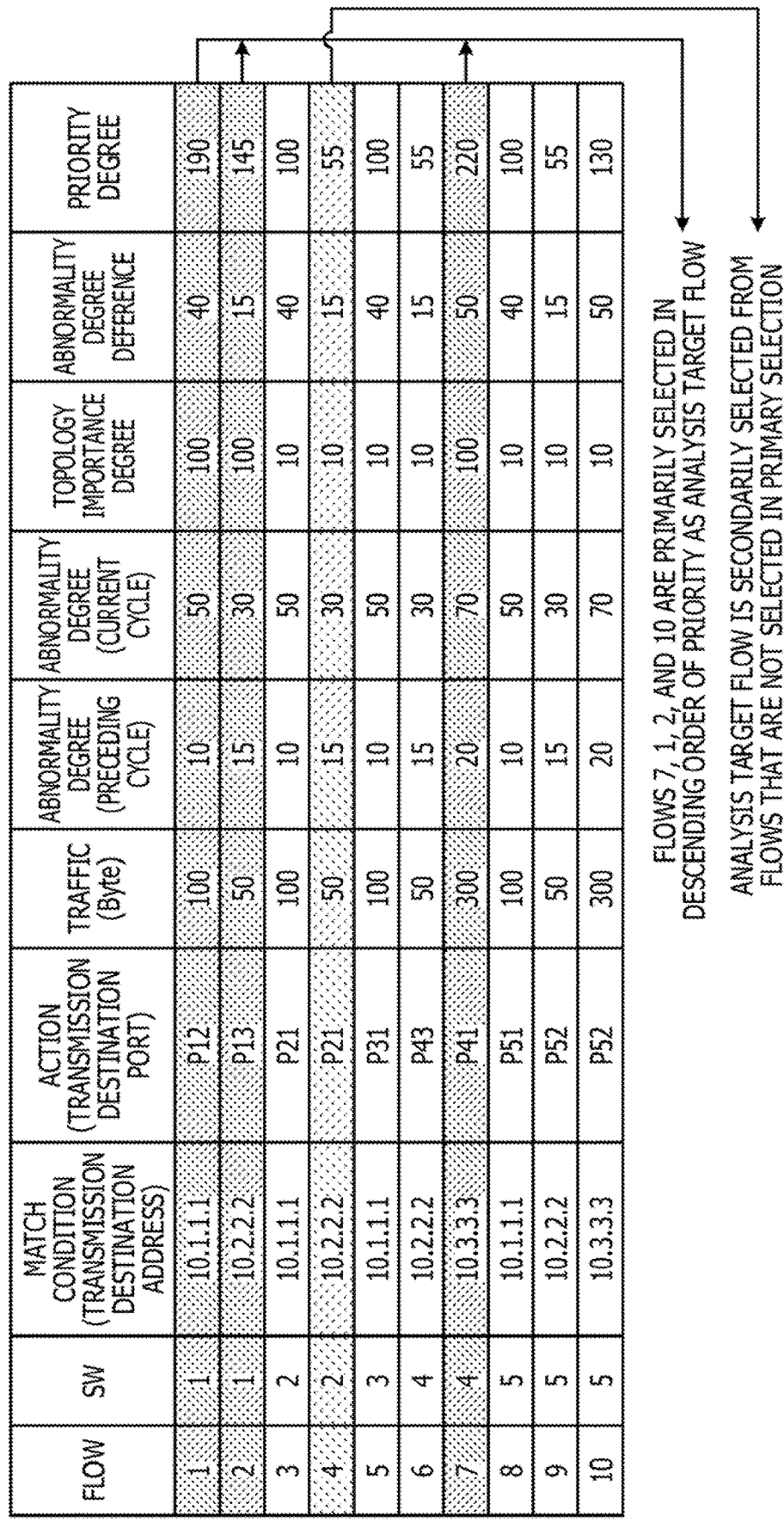
FIG. 14 depicts an example of a flow selected as an analysis target flow in the second embodiment.

FIG. 14 is a view depicting an example of a flow selected as an analysis target flow in the second embodiment. The control apparatus 300 selects, for example, three (N=3) analysis target flows in the primary selection and one (M=1) analysis target flow in the secondary selection.

In the primary selection S107 of FIG. 13, the control apparatus 300 selects three flows in the descending order of the priority degree as an analysis target. According to FIG. 14, the flow having the highest priority degree is the flow 7 of the priority degree "220." According to FIG. 14, the flow having the second highest priority degree is the flow 1 of the priority degree "190." According to FIG. 14, the flow having the third highest priority degree is the flow 2 of the priority degree "145." In the primary selection S107, the control apparatus 300 selects the flows 1, 2, and 7 as an analysis target flow.

Then, in the secondary selection S108 of FIG. 13, the control apparatus 300 selects the flow 4 as an analysis target flow. The control apparatus 300 selects the flow 4, for example, at random (unintentionally).

By the primary selection S107 and the secondary selection S108, the control apparatus 300 selects the flows 1, 2, 4, and 7 as an analysis target flow.

In the second embodiment, as the secondary selection, the control apparatus 300 selects some analysis target flow irrespective of the priority degree. Consequently, the control apparatus 300 may select, as an analysis target, a flow that has not been made an analysis target for a long period of time because the priority degree has been low for a long period of time, and such a situation that a specific flow is not analyzed at all may be suppressed.

Third Embodiment

Now, a third embodiment is described. In the third embodiment, the control apparatus 300 performs aggregation or distribution of flows in response to the priority degree.

<Analysis Target Flow Selection Process>

Figure 15:
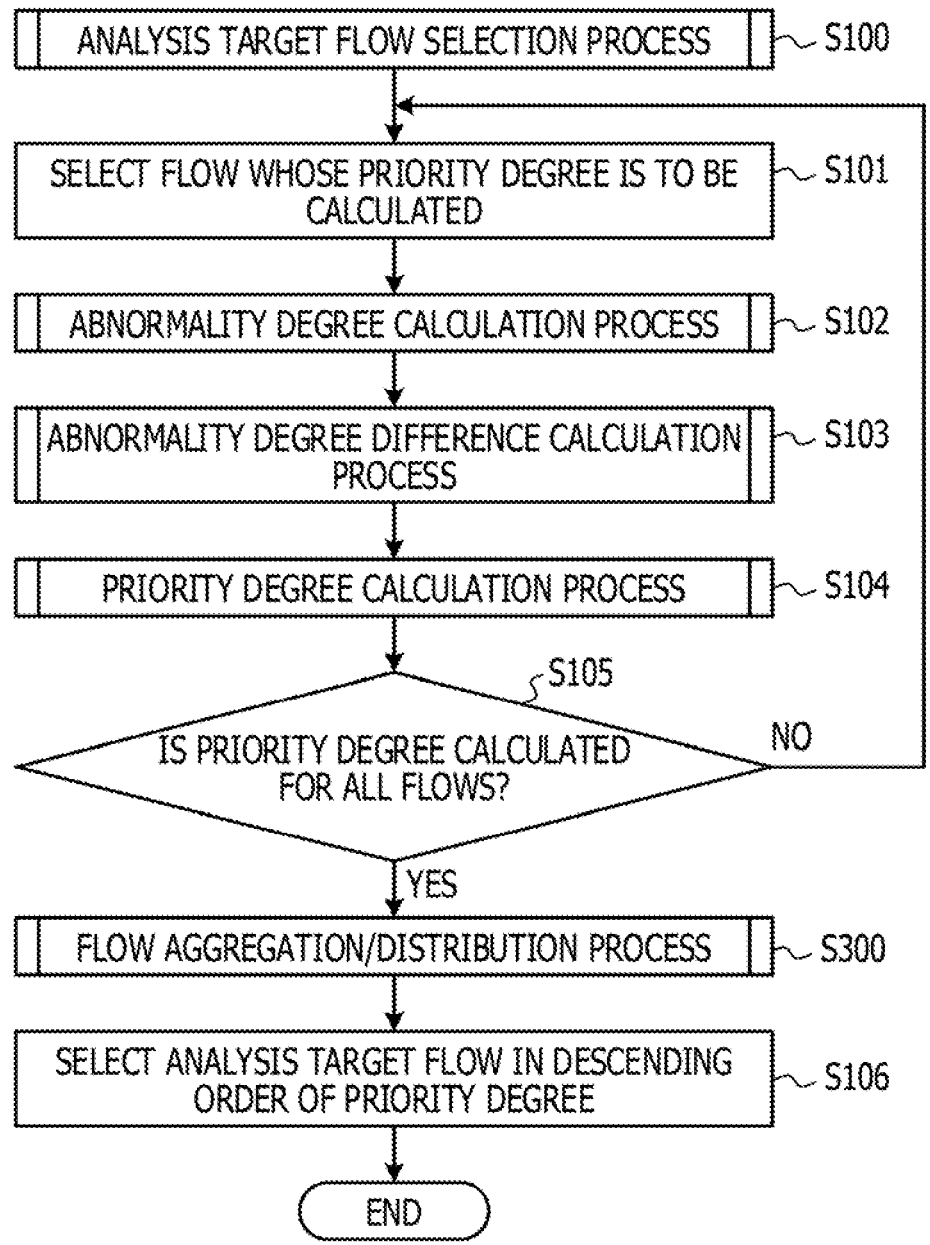
FIG. 15 depicts an example of a processing flow of an analysis target flow selection process S100 in a third embodiment.

FIG. 15 is a view depicting an example of a processing flow of the analysis target flow selection process S100 in the third embodiment. Processes S101 to S106 are similar to those of the analysis target flow selection process S100 depicted in FIG. 6. In the analysis target flow selection process S100 in the third embodiment, a flow aggregation/distribution process (S300) is performed before an analysis target flow is selected in the descending order of the priority degree. The flow aggregation/distribution process S300 is a process for distributing or aggregating a flow based on the priority degree. The aggregation is to couple a first number (plurality) of flows to a second number of flows smaller than the first number. On the other hand, the distribution is to divide, for example, a third number of flows to a fourth number (plurality) of flows greater than the third number.

Figure 16:
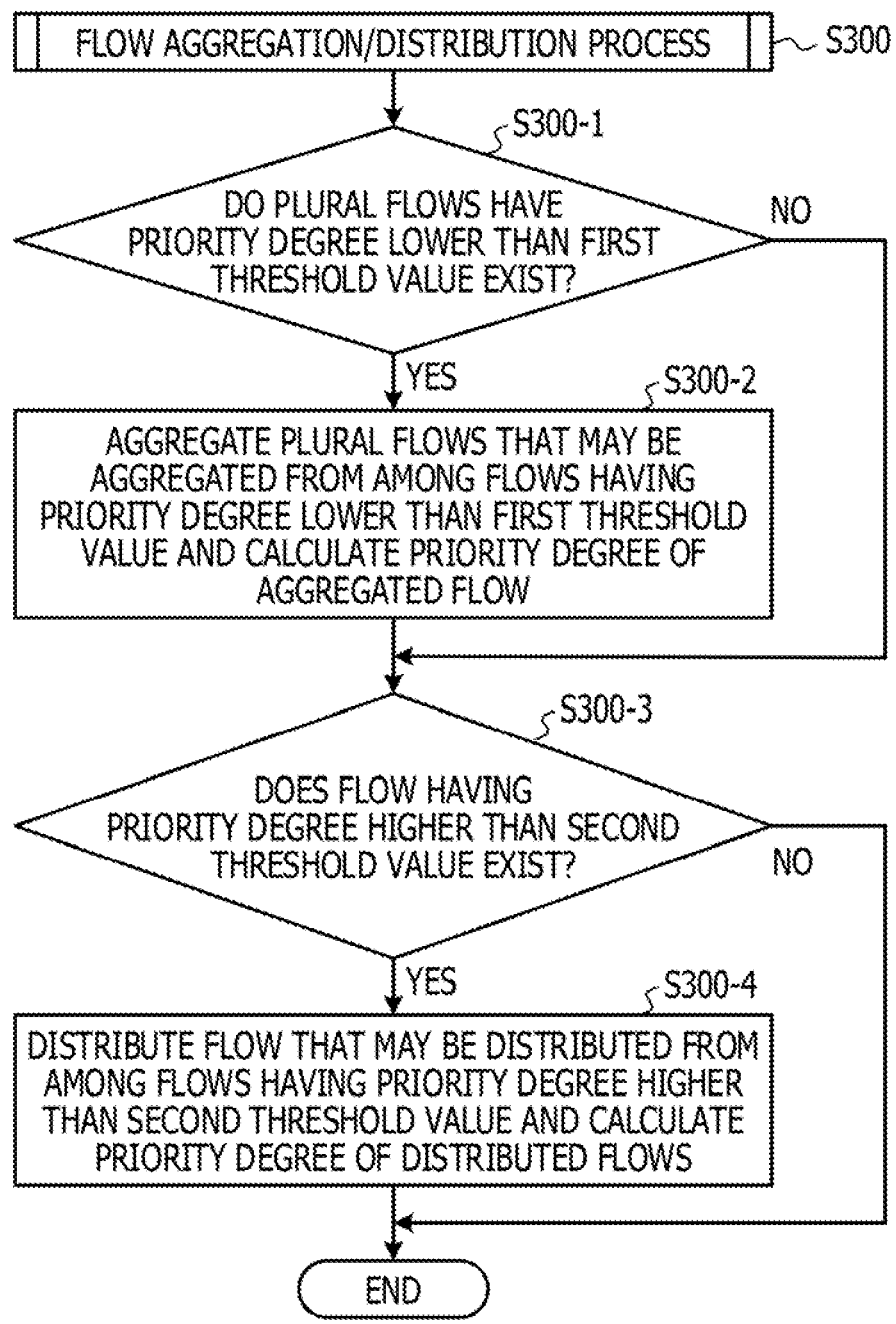
FIG. 16 depicts an example of a processing flow chart of a flow aggregation/distribution process S300.

FIG. 16 is a view depicting an example of a processing flow chart of the flow aggregation/distribution process S300. The control apparatus 300 confirms whether or not a plurality of flows have a priority degree lower than a first threshold value (S300-1). In the case where a plurality of flows have a priority degree lower than the first threshold value (Yes in S300-1), the control apparatus 300 aggregates flows that may be aggregated from among flows having a priority degree lower than the first threshold value and calculates a priority degree of the aggregated flow (S300-2).

On the other hand, in the case where a plurality of flows do not have a priority degree lower than the first threshold value (No in S300-1), the control apparatus 300 does not carry out the process S300-2 but performs a process S300-3.

The control apparatus 300 confirms whether or not there exists a flow having a priority degree higher than a second threshold value (S300-3). In the case where a flow having a priority degree higher than the second threshold value exists (Yes in S300-3), the control apparatus 300 distributes a flow that may be distributed from among flows having a priority degree higher than the second threshold value and calculates a priority degree of the distributed flows (S300-4).

On the other hand, in the case where a flow having a priority degree higher than the second threshold value does not exist (No in S300-3), the control apparatus 300 ends its processing without carrying out the process S300-4.

FIG. 17 is a view depicting an example in which flows are aggregated. The control apparatus 300 confirms that two flows (flows 1 and 2) having a priority degree lower than the first threshold value (for example, 20) exist (Yes in S300-1 of FIG. 16). Then, the control apparatus 300 decides whether or not the flows 1 and 2 may be aggregated.

The flows 1 and 2 have transmission addresses of 10.4.4.4 (communication apparatus 100-4) that are the same transmission destination (FIG. 17A). Therefore, by generating a new flow 1 in which the transmission source addresses of the flows 1 and 2 are deleted from their match condition and only the transmission destination address is set as a match condition, the control apparatus 300 may aggregate the flows 1 and 2 before aggregation into the new flow 1 after the aggregation (FIG. 17B). In this manner, in the case where a plurality of flows have a same transmission destination or a same transmission source, the plurality of flows may be aggregated. Further, in the case where a plurality of flows have a same action (are to be transported to a same port), the plurality of flows may be aggregated.

FIG. 18 is a view depicting an example in which a flow is distributed. The control apparatus 300 confirms that a flow (flow 1) having a priority degree lower than the second threshold value (for example, 150) exists (Yes in S300-3 of FIG. 16). Then the control apparatus 300 decides whether or not the flow 1 may be distributed.

Although, in the flow 1, the transmission destination address is a match condition, the transmission source address is not a match condition (FIG. 18A). Therefore, the control apparatus 300 adds the transmission source address of the flow 1 to the match condition and generates new flows 1 and 2 in which both the transmission destination address and the transmission source address are the match condition. By this, the flow 1 before distribution may be distributed to the new flows 1 and 2 after the distribution (FIG. 18B). In this manner, in the case where the match condition of a flow includes only one of a transmission destination and a transmission source, the flow may be distributed to a plurality of flows.

In the third embodiment, the control apparatus 300 aggregates a plurality of flows having a low priority degree into a single flow. By aggregating flows, the control apparatus 300 may reduce the number of flows that are made an analysis target and thereby reduce the load of the traffic analysis. Further, the control apparatus 300 distributes a plurality of flows having a high priority degree to form a plurality of flows. By distributing a flow, the control apparatus 300 may subdivide a flow, which has a high priority degree before distribution, into and analyze flows, and consequently, the analysis accuracy is enhanced.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An information processing apparatus configured to analyze data traffic of a plurality of flows transmitted through a plurality of switches, the information processing apparatus comprising:
a memory; and
a processor coupled to the memory and configured to:
acquire, from the plurality of switches, first communication amount information indicating a first communication amount per unit, period of time of each of the plurality of flows at a first timing;
specify, based on the first communication amount information, a predictive communication amount per the unit period of time of each of the plurality of flows at a second timing later than the first timing;
acquire, from the plurality of switches, second communication amount information indicating a second communication amount per the unit period of time of each of the plurality of flows at the second timing;
specify a difference between the predictive communication amount and the second communication amount for each of the plurality of flows;
specify a priority degree of each of the plurality of flows based on the difference and a topology value determined for each of the plurality of flows in response to topology of the plurality of switches; and
analyze the data traffic of a specific flow selected from the plurality of flows based on the priority degree.

2. The information processing apparatus according to claim 1, wherein
the processor is configured to:
calculate an abnormality degree value by squaring the difference between the predictive communication amount and the second communication amount; and
specify the priority degree based on the abnormality degree value and the topology value.

3. The information processing apparatus according to claim 2, wherein
the processor is configured to:
specify the priority degree based on the abnormality degree value, a variation amount of the abnormality degree value, and the topology value.

4. The information processing apparatus according to claim 3, wherein
the processor is configured to:
specify a value obtained by addition of the abnormality degree value, the topology value, and the variation amount of the abnormality degree value as the priority degree; and
select the specific flow in a descending order of the priority degree from the plurality of flows.

5. The information processing apparatus according to claim 1, wherein
the processor is configured to:
calculate an absolute value of the difference between the predictive communication amount and the second communication amount; and
specify the priority degree based on the absolute value and the topology value.

6. The information processing apparatus according to claim 1, wherein
a first flow of the plurality of flows is transmitted from a first communication apparatus to a second communication apparatus through at least a first switch included in the plurality of switches, and
the topology value of the first flow is a first value in a case where the first switch and the second communication apparatus are coupled to each other through a second switch included in the plurality of switches, and the topology value of the first flow is a second value greater than the first value in a case where the first switch and the second communication apparatus are directly coupled to each other.

7. The information processing apparatus according to claim 1, wherein
the processor is configured to:
when a first number of the flows having a priority degree lower than a first threshold value exist, aggregate, the first number of flows into a second number of flows less than the first number.

8. The information processing apparatus according to claim 1, wherein
the processor is configured to:
when a third number of the flows having a priority degree greater than a second threshold value exist, distribute the third number of flows to a fourth number of flows greater than the third number.

9. The information processing apparatus according to claim 1, wherein
the processor is configured to:
when a first number of the flows having a priority degree less than a first threshold value exist, aggregate the first number of flows into a second number of flows less than the first number; and
when a third number of the flows having a priority degree greater than a second threshold value that is greater than the first threshold value exist, distribute the third number of flows to a fourth number of flows greater than the first number.

10. A method of analyzing data traffic of a plurality of flows transmitted through a plurality of switches, the method comprising:
acquiring, from the plurality of switches, first communication amount information indicating a first communication amount per unit period of time of each of the plurality of flows at a first timing;
specifying, based on the first communication amount information, a predictive communication amount per the unit period of time of each of the plurality of flows at a second timing later than the first timing;
acquiring, from the plurality of switches, second communication amount information indicating a second communication amount per the unit period of time of each of the plurality of flows at the second timing;
specifying a difference between the predictive communication amount and the second communication amount for each of the plurality of flows;
specifying a priority degree of each of the plurality of flows based on the difference and a topology value determined for each of the plurality of flows in response to topology of the plurality of switches; and
analyzing the data traffic of a specific flow selected from the plurality of flows based on the priority degree.

11. The method according to claim 10, further comprising:
calculating an abnormality degree value by squaring the difference between the predictive communication amount and the second communication amount; and
specifying the priority degree based on the abnormality degree value and the topology value.

12. The method according to claim 11, further comprising:
specifying the priority degree based on the abnormality degree value, a variation amount of the abnormality degree value, and the topology value.

13. The method according to claim 12, further comprising:
specifying a value obtained by addition of the abnormality degree value, the topology value, and the variation amount of the abnormality degree value as the priority degree; and
selecting the specific flow in a descending order of the priority degree from the plurality of flows.

14. The method according to claim 10, further comprising:
calculating an absolute value of the difference between the predictive communication amount and the second communication amount; and,
specifying the priority degree based on the absolute value and the topology value.

15. The method according to claim 10, wherein
a first flow of the plurality of flows is transmitted from a first communication apparatus to a second communication apparatus through at least a first switch included in the plurality of switches, and
the topology value of the first flow is a first value in a case where the first switch and the second communication apparatus are coupled to each other through a second switch included in the plurality of switches, and the topology value of the first flow is a second value greater than the first value in a case where the first switch and the second communication apparatus are directly coupled to each other.

16. A non-transitory computer-readable storage medium storing a program that causes an information processing apparatus to execute a process, the information processing apparatus configured to analyze data traffic of a plurality of flows transmitted through a plurality of switches, the process comprising:
acquiring, from the plurality of switches, first communication amount information indicating a first communication amount per unit period of time of each of the plurality of flows at a first timing;
specifying, based on the first communication amount information, a predictive communication amount per the unit period of time of each of the plurality of flows at a second timing later than the first timing;
acquiring, from the plurality of switches, second communication amount information indicating a second communication amount per the unit period of time of each of the plurality of flows at the second timing;
specifying a difference between the predictive communication amount and the second communication amount for each of the plurality of flows;
specifying a priority degree of each of the plurality of flows based on the difference and a topology value determined for each of the plurality of flows in response to topology of the plurality of switches; and
analyzing the data traffic of a specific flow selected from the plurality of flows based on the priority degree.

17. The non-transitory computer-readable storage medium according to claim 16, the process further comprising:
calculating an abnormality degree value by squaring the difference between the predictive communication amount and the second communication amount; and
specifying the priority degree based on the abnormality degree value and the topology value.

18. The non-transitory computer-readable storage medium according to claim 17, the process further comprising:
specifying the priority degree based on the abnormality degree value, a variation amount of the abnormality degree value, and the topology value.

19. The non-transitory computer-readable storage medium according to claim 16, the process further comprising:
calculating an absolute value of the difference between the predictive communication amount and the second communication amount; and
specifying the priority degree based on the absolute value and the topology value.

20. The non-transitory computer-readable storage medium according to claim 16, wherein
a first flow of the plurality of flows is transmitted from a first communication apparatus to a second communication apparatus through at least a first switch included in the plurality of switches, and
the topology value of the first flow is a first value in a case where the first switch and the second communication apparatus are coupled to each other through a second switch included in the plurality of switches, and the topology value of the first flow is a second value greater than the first value in a case where the first switch and the second communication apparatus are directly coupled to each other.

* * * * *